United States Patent [19]

Nagano

[11] Patent Number: 4,551,121
[45] Date of Patent: Nov. 5, 1985

[54] FRONT DERAILLEUR FOR A BICYCLE
[75] Inventor: Masashi Nagano, Izumi, Japan
[73] Assignee: Shimano Industrial Company Limited, Osaka, Japan
[21] Appl. No.: 595,680
[22] Filed: Apr. 2, 1984
[30] Foreign Application Priority Data
  Apr. 1, 1983 [JP] Japan .................................. 58-58338
[51] Int. Cl.[4] ........................ F16H 7/22; F16H 11/08; F16H 7/18
[52] U.S. Cl. .................................... 474/140; 474/78; 474/80; 474/82
[58] Field of Search .................. 474/140, 78, 80, 116, 474/122, 82

[56] References Cited
U.S. PATENT DOCUMENTS

| | | | |
|---|---|---|---|
| 4,223,562 | 9/1980 | Nagano et al. | 474/82 |
| 4,237,743 | 12/1980 | Nagano | 474/140 |
| 4,279,605 | 7/1981 | Egami | 474/82 |
| 4,424,048 | 1/1984 | Shimano | 474/82 |
| 4,452,593 | 6/1984 | Coué | 474/80 |
| 4,479,787 | 10/1984 | Bonnard | 474/82 |

Primary Examiner—Stephen J. Novosad
Assistant Examiner—Bruce M. Kisliuk
Attorney, Agent, or Firm—Stevens, Davis, Miller & Mosher

[57] ABSTRACT

A front derailleur for a bicycle having a chain guide with inner and outer plates for shifting a driving chain from one to another of at least two front chain gears. The inner plate has a swollen portion extending toward the outer plate, which urges the chain toward a larger diameter front chain gear and which is disposed between a first chain traversing position where the chain, when in the process of being shifted from a smaller diameter front chain gear to the larger diameter one, traverses the chain guide at an initial stage wherein the chain is raised by contact with the larger diameter chain gear and a second chain traversing position where the chain traverses the chain guide at the final stage wherein the chain is raised by contact with the larger diameter gear before completion of the chain shift operation.

9 Claims, 11 Drawing Figures

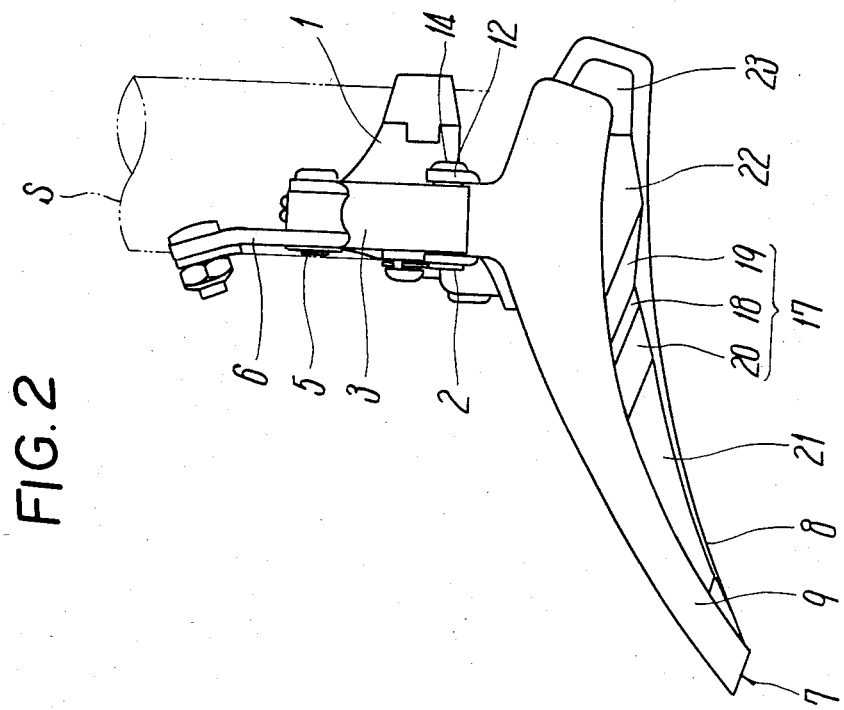
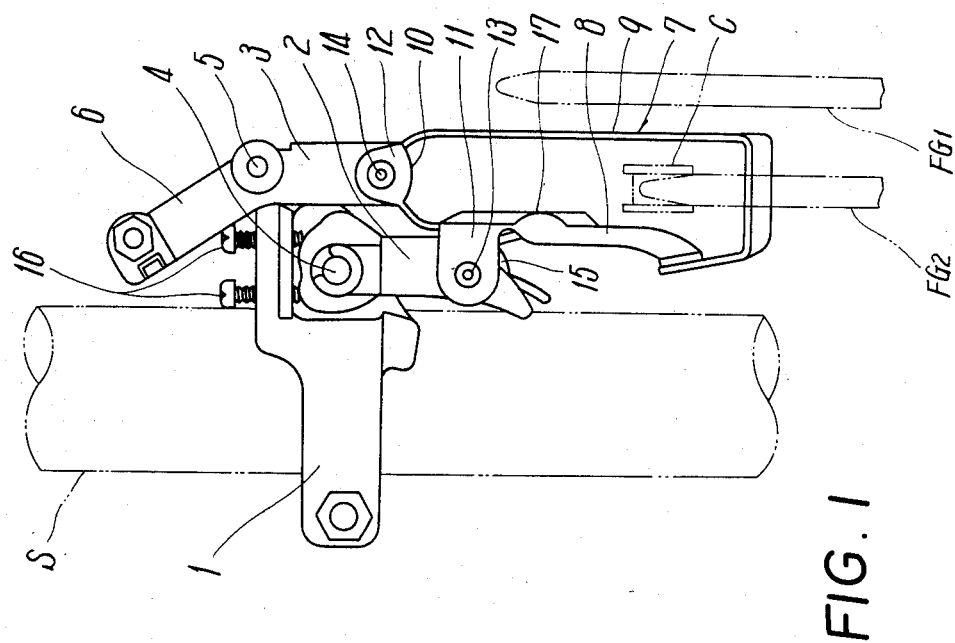

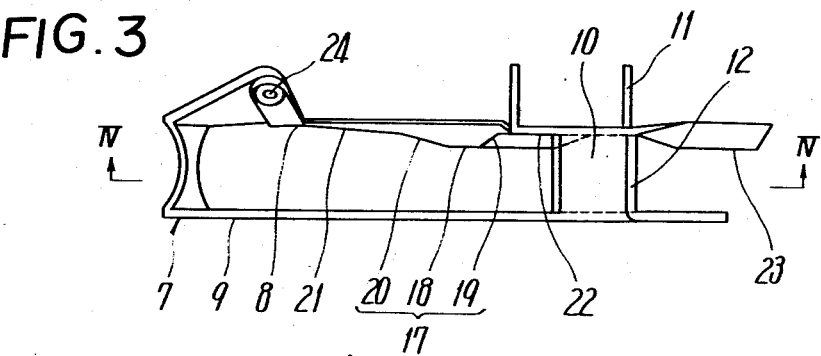
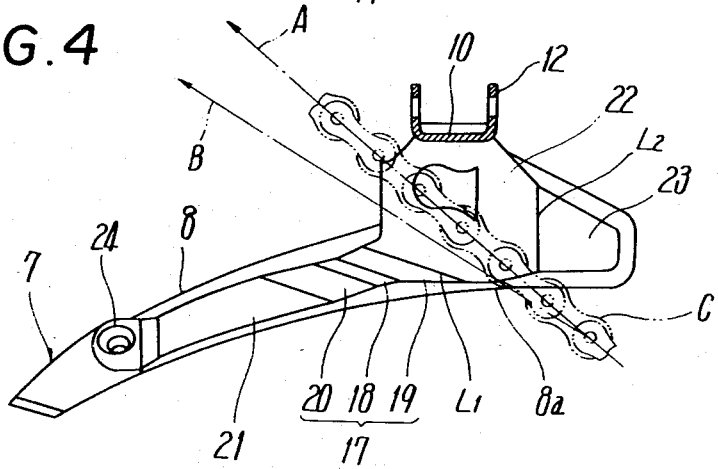
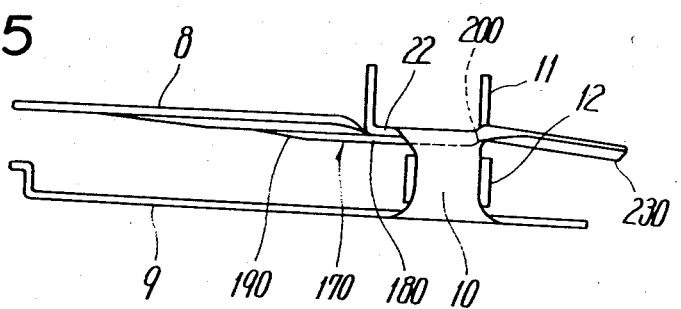
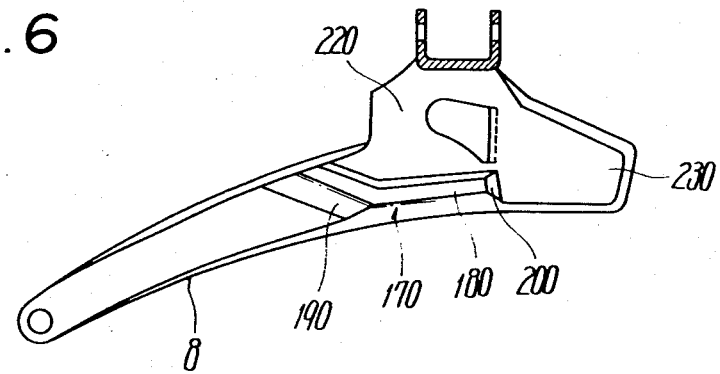

FIG. 7    FIG. 8    FIG. 9
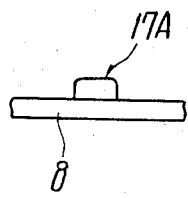
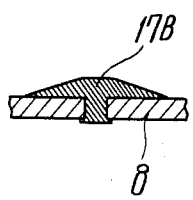
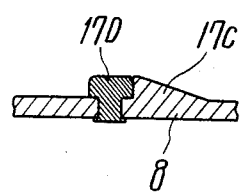
FIG. 10
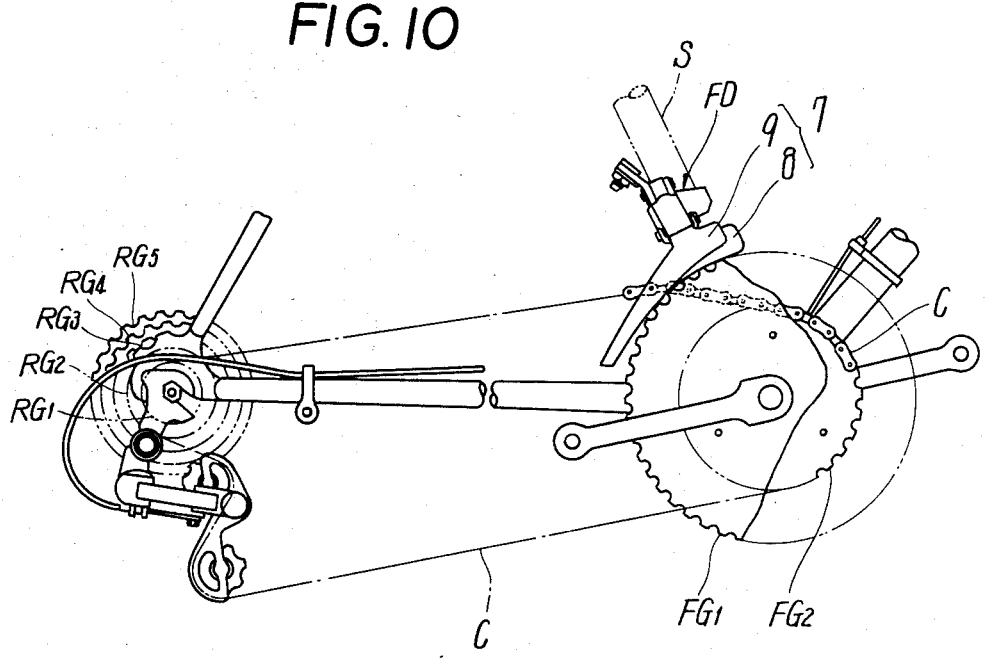
FIG. 11
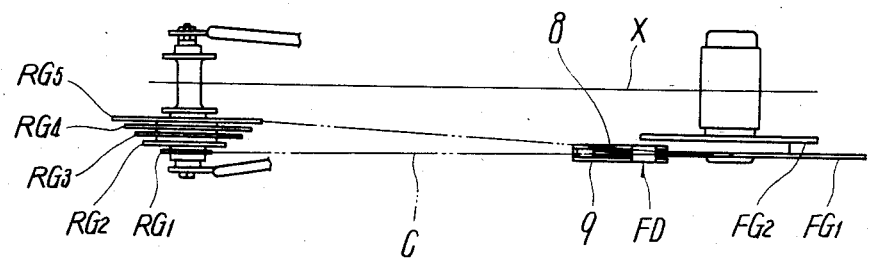

FRONT DERAILLEUR FOR A BICYCLE

FIELD OF THE INVENTION

This invention relates to a front derailleur for a bicycle, and more particularly to a front derailleur which is provided with a chain guide having an inner plate and an outer plate and which is used to shift a driving chain from one another of at least two front chain gears.

BACKGROUND OF THE INVENTION

Generally, in the bicycle, a plurality of front chain gears and rear chain gears are used for the multistage speed change as is well-known; the center of the axial arrangement of the rear chain gears and the same of the front chain gears are aligned longitudinally of the bicycle. For example, in the ten stage speed change device as shown in FIGS. 10 and 11, the center of the axial arrangement of rear chain gears $RG_1$, $RG_2$, $RG_3$, $RG_4$ and $RG_5$, that is, the gear $RG_3$, and the center of the axial arrangement of the front chain gears $FG_1$ and $FG_2$, are aligned in parallel to the longitudinal center line X of the bicycle.

In the multistage speed-change device constructed as described above, the driving chain C, when engaged with the larger diameter top front chain gear $FG_1$ and when shifted to the largest diameter top rear chain gear $RG_5$ or the smallest diameter low rear chain gear $RG_1$, is slanted as shown by the chain line in FIG. 11 with respect to the center line X, which is similar to shifting of chain C in engagement with the smaller diameter low front gear $FG_2$.

Hence, a chain guide 7 at the conventional front derailleur FD should have an interval between an inner plate 8 and an outer plate 9 sufficiently larger than a width of chain C, because a narrow interval will cause the chain to incline along the chain line in FIG. 11 to come into contact with the inner plate 8 or outer plate 9, thereby generating noises and promoting wearing of each plate 8 or 9.

However, a sufficiently wide interval between both the plates 8 and 9 to satisfiy the above criteria will result in deterioration of the speed change efficiency.

Furthermore, the chain C is shifted by being pushed by the inner or outer plate in contact with the chain C, and both the plates each have a flat surface normally parallel to each front gear, thereby generating noises. Particularly, in a case where a control lever is operated slowly to pull a control wire so as to shift the chain from the smaller diameter front low gear to the larger diameter top gear, the chain is kept longer in contact with each plate, thereby elongating the noise generation time.

SUMMARY OF THE INVENTION

An object of the invention is to provide a front derailleur simple in construction, which can prevent the driving chain from generating noises caused by its contact with the inner or outer plate at the chain guide, and which can prevent wearing of each plate even when the chain is shifted to the largest diameter rear chain gear or the smallest diameter one with the chain line inclined at a large angle. Other objects are to provide a front derailleur with improved speed change efficiency, and further, to provide a front derailleur wherein, even when a control lever is operated slowly to shift the chain through a control wire from a smaller diameter low front chain gear to a larger diameter top one, the derailleur can shift the chain quickly to thereby reduce the time of contacting the chain with the inner plate and restrict noise generation to a minimum.

This invention is characterized in that the front derailleur, which is provided with a chain guide having inner and outer plates and shifts the driving chain from one to another of at least two front chain gears, is provided at the inner plate with a swollen or enlarged portion swollen toward the outer plate, for urging the chain toward the larger diameter front chain gear, the swollen portion being disposed between a chain traversing position defined as a position where the chain, when intended to be shifted from the smaller diameter front chain gear to the larger diameter one, traverses the chain guide at the initial stage of raising when the chain is raised by the larger diameter front chain gear when the chain is in contact therewith and a final chain traversing position defined as a position where the chain traverses the chain guide at the final stage of raising when the chain is being raised by the larger diameter gear just before the completion of the chain shift.

In this invention, not-swollen portions other than the swollen portion at the inner plate are formed to be spaced from the outer plate at a sufficiently large interval so that the chain in engagement with any one front chain gear and any rear chain gear i.e., covering all the various different chain lines, is not brought into contact with the inner or outer plate.

Also, in a special example of the invention, the inner plate of the chain guide is provided at the lengthwise front portion with an auxiliary swollen portion beyond the aforesaid not-swollen portion.

In this construction, the auxiliary swollen portion allows the chain to be further effectively raised by the larger diameter top front chain gear and engage therewith.

In either case, the swollen portion provided on the inner plate, even when the control lever is operated slowly to pull the control wire, enables the chain to quickly shift to the larger diameter front gear, thereby improving the speed change efficiency and minimizing noise generation.

The above and further objects and novel features of the invention will be more fully apparent from the following detailed description when the same is read in connection with the accompanying drawings.

BRIEF DESCRIPTION OF THE DRAWINGS

FIG. 1 is a rear view of a first embodiment of a front derailleur of the invention, FIG. 2 is a front view of the first embodiment, FIG. 3 is a plan view of a chain guide only, FIG. 4 is a sectional view taken on the line IV—IV in FIG. 3, FIG. 5 is a plan view of a chain guide only at a second embodiment of the invention, FIG. 6 is a sectional view taken on the line VI—VI in FIG. 5, FIGS. 7 through 9 are illustrations of other examples of a swollen portion, and FIGS. 10 and 11 are illustrations of the relation between the front chain gears and the rear chain gears.

DETAILED DESCRIPTION OF THE INVENTION

Referring to FIG. 1, a front derailleur of the invention comprising a larger diameter top front chain gear $FG_1$ and a smaller diameter low front chain gear $FG_2$, is mounted to a seat tube S at the bicycle frame.

The front derailleur of the invention, as shown in FIG. 1, basically comprises a mounting member 1 mounted to the seat tube S, a pair of linkage members 2 and 3 pivoted to the mounting member 1 through pivot pins 4 and 5, and a chain guide 7. Linkage member 2 is disposed in proximity to the seat tube S, and linkage member 3 is disposed upwardly with respect to the linkage member 2 and spaced apart outwardly therefrom and is provided with a support 6 for a control wire.

The chain guide 7 comprises an inner plate 8, an outer plate 9 and a connecting member 10 for connecting the plates 8 and 9 substantially in parallel to each other and spaced at an interval sufficiently larger than a width of a chain C. Inner plate 8 has a pivoting member 11 extending laterally outwardly therefrom, and connecting member 10 has a pivoting member 12 extending upwardly therefrom. Both pivoting members 11 and 12 are pivoted to the lower ends of linkage members 2 and 3 through pivot pins 13 and 14 respectively. Also, a return spring 15 is provided at the pivot pin 13 and biases the chain guide 7 toward the smaller diameter chain gear $FG_2$ so that the control wire is pulled to turn the wire support 6 counterclockwise in FIG. 1, thereby moving the chain guide 7 toward the larger diameter chain gear $FG_1$ against the bias of return spring 15. The control wire is reversely operated to action of return the chain guide 7 by the return spring 15 toward the chain gear $FG_2$. In addition, the chain guide 7 is controlled or adjusted by adjusting screws 16 in reciprocation axially of gears $FG_1$ and $FG_2$.

Now, a first embodiment of the front derailleur of the invention is shown in FIGS. 1 through 4, in which the inner plate 8 is provided with a swollen or enlarged position between a first chain traversing position and a second chain traversing position. The swollen portion functions to push chain C toward the larger diameter chain gear $FG_1$. The first chain traversing position is the position where the chain C traverses the chain guide 7 at the initial stage of raising the chain through contact with the larger diameter chain gear $FG_1$, and the second traversing position is the position where the chain C traverses the chain guide at the final stage of raising the chain through contact with the gear $FG_1$, to keep the chain raised just before completion of the chain shift.

The swollen portion 17, as shown in FIGS. 2 through 8, is provided with a crest 18 and slopes 19 and 20 at both sides thereof extending along the chain traversing path. The crest 18 is long and wide enough to push the chain C, even when chain C is engaging with any rear chain gear, toward the larger diameter front chain gear $FG_1$, and slopes 19 and 20 each are made small in width so that the chain C smoothly travels without being caught by the crest 18 and also is restricted from contact with the slopes 19 and 20.

Also, not-swollen portions 21 and 22, as shown in FIGS. 3 and 4, are provided at the outside of each slope 19 or 20, and an auxiliary swollen portion 23 is provided at the front of inner plate 8 beyond the not-swollen portion 22.

The not-swollen portions 21 and 22 each are spaced from the outer plate 9 at an interval large enough to allow the chain C to pass between the inner and outer plates 8 and 9 without contacting therewith even when the chain C in engagement with the gear $FG_1$ or $FG_2$ is changed in its chain line.

The auxiliary swollen portion 23 cooperates with the swollen portion 17 to effectively push the chain C toward the larger front chain gear $FG_1$, which is not indispendable to this invention.

The not-swollen portion 22 between the swollen portion 17 and the auxiliary swollen portion 23, is provided at the position corresponding to the chain C in engagement with the larger diameter gear $FG_1$, i.e., where the chain traverses the chain guide 7, so that the chain C, after being shifted to the largest diameter rear chain gear $RG_5$ so that it has a more largely inclined chain line as shown in FIG. 11, is free from contact with the inner plate 8.

In other words, the chain, when in engagement with the larger diameter front chain gear $FG_1$ and the largest rear chain gear $RG_5$, travels through the path A (FIG. 4) and when in engagement with the gear $FG_1$ and the smallest diameter rear chain gear $RG_1$, travels through the path B, the paths A and B having therebetween a certain distance, which is smaller at the lower edge 8a through which the chain C exits from the chain guide 7 and larger at the entrance at the chain guide 7 for the chain C.

Therefore, the not-swollen portion 22 is acceptable of all variations in the chain line of chain C traversing the chain guide 7. In detail, referring to FIG. 4, the front edge $L_1$ of swollen portion 17 is spaced apart with respect to the path B of chain C in engagement with the smallest diameter rear chain gear $RG_1$ and the rear edge $L_2$ of auxiliary swollen portions 23 is spaced apart with respect to the path A of chain C in engagement with the largest diameter one $RG_5$, so that lines L and $L_2$ are formed to have margins with respect to the paths A and B respectively.

In addition, reference numeral 24 in FIGS. 3 and 4 designates a fixture for fixing the inner and outer plates 8 and 9 at the lower ends thereof through screws (not shown).

Thus, the swollen portion 17 at the inner plate 8 increases an amount of guiding the chain C toward the larger diameter front chain gear $FG_1$, so that the chain C, even when the control wire is operated slowly, chan be shifted quickly to the gear $FG_1$. As a result, the time of noise generation of chain C in contact with the gear $FG_1$ is restricted to a minimum.

Furthermore, in the first embodiment, the auxiliary swollen portion 23 at the inner plate 8 cooperates with the swollen portion 17 to push the chain C to reliably shift chain C to the larger diameter front chain gear $FG_1$ even when the chain C pushed by the swollen portion 17 is about to be drawn into the not-swollen portion 22.

Also, the swollen portion 17 contributes to quick shifting of chain C and minimizes the noise generation and the not-swollen portion 22 keeps the chain C not in contact with the inner plate 8 regardless of changes in the chain line, thereby reliably preventing noise generation.

The aforesaid swollen portion 17, as seen from FIG. 4, is slanted widthwise of inner plate 8. Alternatively, the swollen portion may, as shown in FIGS. 5 and 6, extend at the lower portion forwardly lengthwise of inner plate 8 to form a swollen portion 170.

In this case, instead of the aforesaid flat auxiliary swollen portion 23 in FIGS. 3 and 4, an auxiliary sloped swollen portion 230 may be provided, which is slanted forwardly and toward the outer plate 9 as shown in FIG. 5.

Thus, a not-swollen portion 220 shown in a second embodiment of the invention shown in FIGS. 5 and 6, is ensured to be effective the same as in the first embodiment.

Next, in the second embodiment shown in FIGS. 5 and 6, even when the tooth number of the front chain gears largely changes, the effect of improvement in speed change efficiency and reduction of the time of noise generation are attained similarly to the first embodiment.

Incidentally, the aforesaid embodiments are provided with the slopes 19, 20, 190 and 200 in continuation of the crests 17 and 170 respectively, which slopes are not indispenable, but may be replaced by an angular swollen portion 17A as shown in FIG. 7.

The aforesaid swollen portions each are integral with the inner plate 8 by press working, although the swollen portions may alternatively be separate from the inner plate 8 to form a swollen member 17B (FIG. 8), thereby being caulked or the like to the inner plate 8 as shown in FIG. 8.

Also, a part of swollen portion 17C integral with the inner plate 8 and a swollen member 170 separate therefrom may be combined as shown in FIG. 9.

Furthermore, the front derailleur in the aforesaid embodiment is applied to two front chain gears, but is equally applicable to three or more front chain gears.

Although several embodiments have been described, they are merely exemplary of the invention and not to be construed as limiting, the invention being defined solely by the appended claims.

What is claimed is:

1. A front derailleur for a bicycle, which shifts a driving chain from one to another of at least two front chain gears comprising a larger diameter chain gear and a smaller diameter chain gear, said derailleur comprising a chain guide comprising an inner plate, an outer plate, and a connecting member connecting said inner and outer plates substantially parallel to each other and spaced at an interval larger than a width of said chain, said inner plate having a swollen portion expanded toward said outer plate for pushing out said chain toward said larger diameter chain gear, said swollen portion being disposed between a first chain traversing position where said chain, while being shifted from said smaller diameter chain gear to said larger diameter chain gear, traverses said chain guide at an initial raising stage in which said chain is initially raised relative to said chain gears by contact with said larger diameter chain gear and a second chain traversing position where said chain traverses said chain guide at a final raising stage in which said chain is maintained in a raised position relative to said chain gears before completion of shifting of said chain to said larger diameter chain gear.

2. A front derailleur for a bicycle according to claim 1, wherein said swollen portion extends along a longitudinal dimension of said inner plate.

3. A front derailleur for a bicycle according to claim 1, wherein said swollen portion extends along a longitudinal dimension of said inner plate and one lengthwise end of said swollen portion terminates at a widthwise upper edge of said inner plate and another lengthwise end of said swollen portion terminates at a widthwise lower edge of said inner plate.

4. A front derailleur for a bicycle according to claim 1, wherein said swollen portion is integral with said inner plate.

5. A front derailleur for a bicycle according to claim 1, wherein said swollen portion is separate from said inner plate and fixed thereto by a mounting means.

6. A front derailleur for a bicycle according to claim 1, wherein said inner plate includes a sloping portion on each side of said swollen portion, each said sloping portion being located between said swollen portion and a non-swollen portion on said inner plate, each said sloping portion being in continuation of a said non-swollen portion, said sloping portions and said non-swollen portions being slanted relative to a longitudinal dimension of said inner plate.

7. A front derailleur for a bicycle according to claim 1, further comprising an auxiliary swollen portion expanded toward said outer plate and located at a lengthwise front portion relative to a longitudinal dimension of said inner plate, said auxiliary swollen portion for urging said chain toward said larger diameter chain gear when said chain has been raised by said larger diameter chain gear, and a non-swollen portion disposed between said auxiliary swollen portion and said swollen portion.

8. A front derailleur for a bicycle according to claim 7, wherein said auxiliary swollen portion has a flat surface substantially parallel to said outer plate.

9. A front derailleur for a bicycle according to claim 7, wherein said auxiliary swollen portion is slanted toward said outer plate such that said auxiliary swollen portion is closer to said outer plate at portions relatively closer to a front end of said inner plate than at portions relatively closer to a rear end of said inner plate.

* * * * *